US011502633B2

(12) United States Patent
Elmaanaoui et al.

(10) Patent No.: US 11,502,633 B2
(45) Date of Patent: Nov. 15, 2022

(54) MOTOR POSITION CONTROL BASED ON SERVO-TO-EDGE DIRECTION FEEDBACK

(71) Applicant: Canon U.S.A., Inc., Melville, NY (US)

(72) Inventors: Badr Elmaanaoui, Belmont, MA (US); Alexander Altshuler, Cambridge, MA (US); Pierre-Yves Mabboux, Arlington, MA (US)

(73) Assignee: Canon U.S.A., Inc., Melville, NY (US)

( * ) Notice: Subject to any disclaimer, the term of this patent is extended or adjusted under 35 U.S.C. 154(b) by 390 days.

(21) Appl. No.: 16/864,794

(22) Filed: May 1, 2020

(65) Prior Publication Data
US 2020/0350846 A1 Nov. 5, 2020

Related U.S. Application Data

(60) Provisional application No. 62/843,066, filed on May 3, 2019.

(51) Int. Cl.
*H02P 23/24* (2016.01)

(52) U.S. Cl.
CPC .......... *H02P 23/24* (2016.02); *H02P 2203/09* (2013.01)

(58) Field of Classification Search
CPC ............................ H02P 23/24; H02P 2203/09
See application file for complete search history.

(56) References Cited

U.S. PATENT DOCUMENTS

| | | | |
|---|---|---|---|
| 4,703,244 A | 10/1987 | Takeuchi et al. | |
| 5,321,501 A | 6/1994 | Swanson et al. | |
| 6,134,003 A | 10/2000 | Tearney et al. | |
| 6,749,344 B2 | 6/2004 | Hamm et al. | |
| 6,965,812 B2 * | 11/2005 | Wang | A61B 1/0004 318/567 |
| 7,107,124 B2 * | 9/2006 | Green | A61B 34/72 700/262 |
| 7,122,985 B2 | 10/2006 | Kikuchi | |
| 7,382,949 B2 | 6/2008 | Bouma et al. | |
| 7,515,265 B2 | 4/2009 | Alfano et al. | |
| 8,237,388 B2 * | 8/2012 | Jinno | A61B 34/70 606/1 |
| 9,345,398 B2 | 5/2016 | Tachibana et al. | |
| 9,360,630 B2 | 6/2016 | Jenner et al. | |
| 9,509,195 B1 | 11/2016 | Edsinger et al. | |

(Continued)

*Primary Examiner* — Zoheb S Imtiaz
(74) *Attorney, Agent, or Firm* — Canon U.S.A., Inc., IP Division

(57) ABSTRACT

System, apparatus, and methods for controlling a motor by using servo-to-edge direction feedback are disclosed. An exemplary apparatus comprises: a fiber optic rotary junction (FORJ) having a rotatable portion; a motor to rotate the rotatable portion; a connector to connect the rotatable portion to a rotatable fiber of an imaging probe; a sensor positioned in close proximity to a target and configured to output a signal indicative of which one of at least two distinguishable regions of the target is proximal to the sensor; and a controller configured to control the rotational direction of the motor based on the sensor signal. In one embodiment, the motor is a servo-motor, and the rotation of the motor and/or rotatable portion is controlled by a servo-loop to change the rotation direction of the motor back-and-forth around a predetermined rotational position without the use of an encoder.

21 Claims, 10 Drawing Sheets

(56) References Cited

U.S. PATENT DOCUMENTS

| | | |
|---|---|---|
| 9,846,940 B1 | 12/2017 | Wang |
| 9,869,828 B2 | 1/2018 | Altshuler |
| 10,095,020 B2 | 10/2018 | Tearney et al. |
| 2006/0291820 A1 | 12/2006 | Kobayashi |
| 2014/0031677 A1 | 1/2014 | Iftimia et al. |
| 2014/0343411 A1 | 11/2014 | O'Brien et al. |

\* cited by examiner

MOTOR POSITION CONTROL BASED ON SERVO-TO-EDGE DIRECTION FEEDBACK

CROSS-REFERENCE TO RELATED APPLICATIONS

The present application claims priority to U.S. provisional application 62/843,066, filed May 3, 2019, the disclosure of which is incorporated by reference herein in its entirety.

BACKGROUND INFORMATION

Field of the Disclosure

The present disclosure generally relates to medical imaging devices. More particularly, the disclosure exemplifies fiber optic rotary junction (FORJ) position control based on electric motor servo-to-edge direction feedback.

Description of Related Art

Imaging modalities that use a mechanically rotated optical probe (e.g., endoscope or catheter) to scan a bodily lumen (e.g., an artery) use a fiber optic rotary joint (FORJ). A FORJ must provide mechanical actuation and optical connectivity between the optical probe and an imaging console. Among other things, the FORJ is used to transmit light between a stationary optical fiber and a rotating optical fiber. The stationary fiber is connected to the imaging console, and the rotating optical fiber is connected to an optical probe. The connection of the optical probe to the FORJ is optical as well as mechanical. The optical connection allows the optical probe to produce a rotating beam at the distal end of the probe, and the mechanical connection allows the optical probe to rotate or oscillate to scan the bodily lumen in order to obtain 2-dimensional images. The FORJ can further include a translation stage to mechanically displace the optical probe linearly along the lumen to obtain 3-dimensional images. A fiber optic rotary joint (herein after abbreviated as either FORJ or simply "rotary joint"), can be implemented in various manners. An example of a rotary joint is described in U.S. Pat. No. 7,382,949 which is incorporated by reference herein for all purposes.

Regardless of how the fiber rotary joint is implemented, a motor (e.g., a DC servo motor or stepping motor) is necessary to drive the rotation of the FORJ. The motor and other mechanical, optical, and electronic elements of the rotary junction are enclosed in a patient interface module or patient interface unit (PIU). U.S. Pat. Nos. 9,360,630 and 9,345,398 describe examples of known driving assemblies for a rotary junction. One of the limitations of these devices is that these drive assemblies tend to require the use of large, cumbersome, and expensive elements to control the rotation and/or translation of rotary junction.

In particular, controlling an electric motor requires various components, besides a motor, such as a motion controller, driver, encoder and limit switches. Some components are absolutely necessary such as motion controller and driver. Others, such as encoder and limit switches, could be optional depending on the type of motor and application targeted.

In general, a motor can be classified as being either open-loop or closed-loop controlled. An open-loop controlled motor, such as a stepper motor, does not require any positional feedback. In this case, an encoder is optional, if accuracy in positioning is not desired. On the other hand, a closed-loop motor such as a DC motor (brushed or brushless) requires some kind of positional feedback and servo-mechanism. Motors that require positional feedback are commonly referred to as servo-motors. In conventional servo-ed motors, an encoder or Hall sensors provide the feedback signal (position input) based on the absolute or actual motor position. This position feedback is compared to the desired position, which gives the positional error, which is input to the servo control loop. The error then goes through a proportional-integral-derivative (PID) controller whose output drives the motor. When the motor is at the desired position, the position error is zero and no corrective output is provided to the motor. However, if the motor deviates from its desired position, the servo-loop becomes active to drive the motor according to the error. The amount, magnitude, or level of the output signal (controlled by the PID function) is a function of the magnitude of error. The feedback is used by the motion controller for proper position and velocity control. For a brushless-DC motor (BLDC), positional feedback can be accomplished in a number of ways, for example, using an encoder (rotary or linear), Hall sensors, or other similar sensors. Positional feedback can also be sensor-less; in this case, the motor position is typically deduced from the motor's back electromotive force (back-EMF).

Encoders give the best positional feedback possible. There is a great diversity of encoder types (absolute vs incremental, linear vs rotary, etc.) and encoder technologies (optical, magnetic, etc.) available. Encoders typically offer resolutions of 1 degree (deg.) or less of angle, for rotary applications, and resolution of 1 µm (micron) or less for linear applications. U.S. Pat. No. 9,509,195 describes an example of a BLDC motor with an embedded encoder.

Hall sensors are position detectors that are built into BLDC motors. These motors being brushless, their commutation is electronic and Hall sensors' primary role is to provide position feedback for commutation. Typically, there are 3 Hall sensors in a BLDC motor and the overall position resolution depends on the motor's number of poles. For example, a BLDC motor having 1 pair of poles (2 poles) provides 6 Hall sensor transitions per revolution of the motor shaft. Therefore a 60 deg. angle resolution between two transitions can be achieved. For a BLDC motor with 4 pairs of poles (8 poles), there are 24 transitions per revolution. Therefore, a 15 deg. angle resolution between two transitions can be achieved.

BLDC motors can also be commutated and controlled without any encoder or Hall sensors. In this case, the shaft position is typically deduced by measuring and detecting the back-EMF zero-crossing position. This technique provides a position feedback resolution similar to Hall sensors. However, detection of absolute position can become unstable.

As stated above, the choice of components is also dictated by the type of application where one typically needs to either control the motor position or its velocity. Position applications for servo-motors are more difficult to implement as they require a more advanced 4-quadrant driver and usually an encoder for accurate position feedback.

Velocity applications for servo-motors are easier to implement. An encoder in this case is optional because Hall sensors or the sensor-less technique using back-EMF provide ample position feedback for speed control. For example, a BLDC motor with 1 pair of poles outputs 6 Hall sensor transitions per revolution of the motor shaft. With a motor spinning at about 1000 revolutions per minute (rpm), this equates to 6000 Hall transitions per minute or 100 Hall transitions per second (sec.).

However, installing the various components, such as a motion controller, driver, encoder or hall sensor, and limit switches, in addition to the motor, results in a drive assembly for the fiber rotary junction being large, cumbersome, and expensive. In addition, processing the large amounts of data from an encoder or Hall sensor takes time and computing resources.

SUMMARY OF EXEMPLARY EMBODIMENTS

This present disclosure provides a method and apparatus to accurately drive the fiber optic rotary junction towards a desired rotational position (e.g., an stop position) using servo-to-edge motor feedback without any encoder where positional feedback is reported to the motion controller at one (or at most two) specific position(s). The following detailed description describes the type of feedback, principle of operation, and advantages the disclosed method and apparatus.

According to at least one embodiment, the present disclosure provides a medical system for imaging a sample, the system comprises: an imaging probe having proximal and distal ends, and configured to be insertable into a luminal sample; an imaging console including a data-processing computer configured to receive data representing energy delivered to and/or collected from the luminal sample; a patient unit interface (PIU) configured to detachably connect the imaging probe to the imaging console; and a fiber optic rotary junction (FORJ) arranged inside the PIU. The FORJ includes: a rotatable portion configured to connect to the distal end of the imaging probe; a motor configured to rotate the rotatable portion of the fiber optic rotating junction; a connector configured to connect the rotatable portion of the fiber optic rotating junction to a rotatable fiber of the imaging probe so as to transmit rotational torque from the motor to the rotatable fiber of the probe and so as to transmit light from a light source through the fiber optic rotary junction to the rotatable fiber of the probe; a sensor positioned in close proximity to a target and configured to emit a signal indicative of which one of at least two distinguishable regions of the target is proximal to the sensor when the motor rotates the rotatable portion of the fiber optic rotary junction; and a controller configured to receive the signal from the sensor and to use the sensor signal in a feedback loop to reverse the rotational direction of the motor when the rotatable portion crosses a predetermined rotational position.

According to another aspect, the present disclosure provides a method for controlling a rotational position of a fiber optic rotary junction (FORJ) having a stationary portion with a stationary fiber and a rotatable portion with a rotatable fiber therein, the method comprising: rotating the rotatable portion of the fiber optic rotating junction with an electric a motor; connecting the rotatable portion of the fiber optic rotating junction to a rotatable fiber of a medical an imaging probe so as to transmit rotational torque from the motor to the rotatable fiber of the probe and so as to transmit light from the fiber optic rotary junction to the rotatable fiber of the optical probe; providing a target on one of the rotatable portion and the stationary portion; providing a sensor on one of the rotatable portion and the stationary portion on which the target is not provided, the sensor positioned in close proximity to the target and configured to emit a signal indicative of which one of at least two distinguishable regions of the target is proximal to the sensor; determining a rotational direction in which the motor rotates the rotatable portion of the fiber optic rotary junction; and controlling the motor using the sensor signal in a feedback loop to reverse the rotational direction when the rotatable portion crosses a predetermined rotational position.

According to various embodiments, the method of controlling includes a step wherein the motor is a servo-motor, and the position of the servo-motor is controlled by using a feedback signal which is direction-based. The method of controlling includes using a binary feedback signal to move a servo-motor to a desired position in an oscillating back-and-forth manner. The method of controlling includes using a binary feedback to actively maintain the position of a servo-motor around a desired position until the servo-motor is stopped at the position. The method of controlling includes a step wherein the position of a servo-motor is controlled by changing the rotation of the motor back-and-forth around a desired position. The method of controlling includes rotating a motor towards and maintaining the motor at a desired position without the use of an encoder. The method of controlling includes moving the rotational position of the motor towards and maintaining the position of the motor, such as servo BLDC motor, to a desired position within a range of zero to 2 degrees of accuracy.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

Further objects, features and advantages of the present disclosure will become apparent from the following detailed description when taken in conjunction with the accompanying figures showing illustrative embodiments of the present disclosure.

Figure 1A:
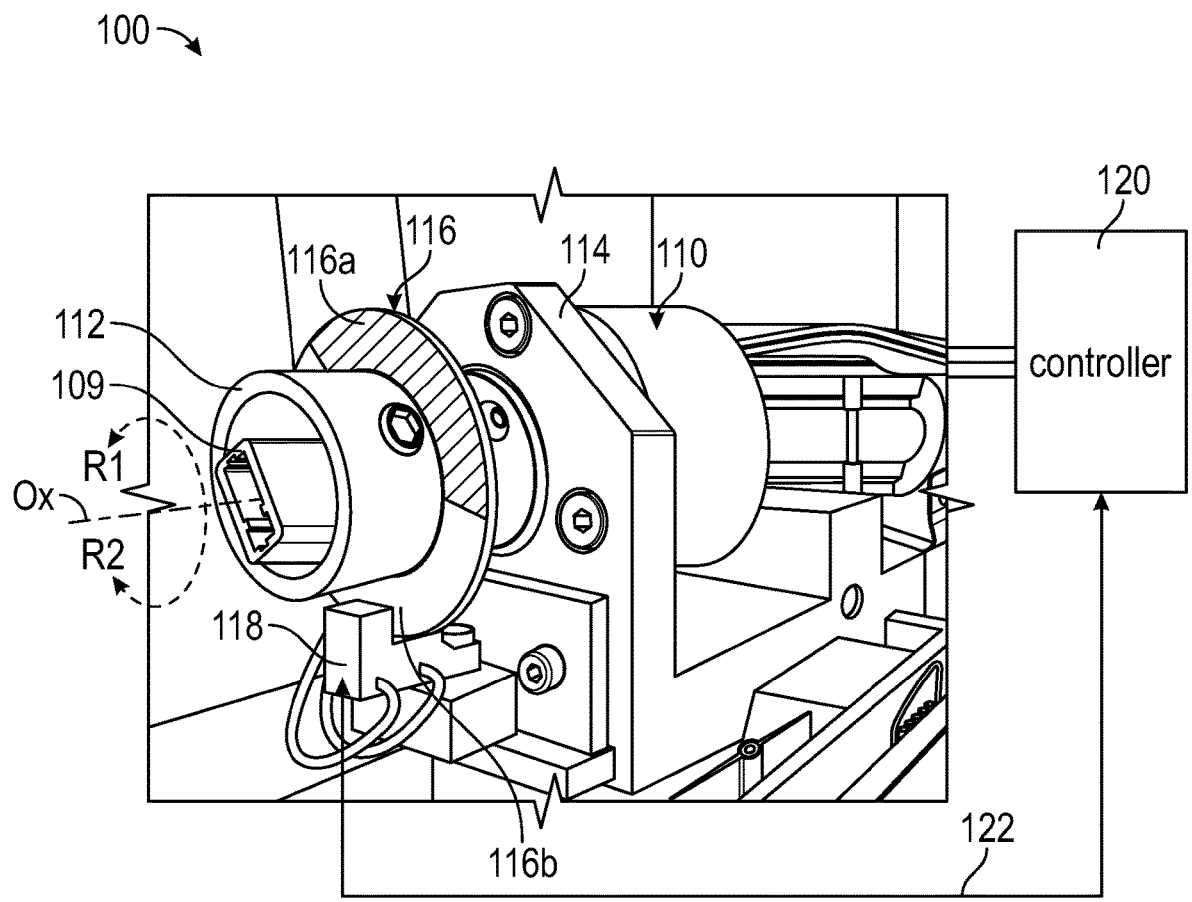
FIG. 1A shows an exemplary motor controlled by servo-to-edge direction feedback.

Throughout the figures, the same reference numerals and characters, unless otherwise stated, are used to denote like features, elements, components or portions of the illustrated embodiments. Moreover, while the subject disclosure will be described in detail with reference to the figures, it is done so in connection with the illustrative exemplary embodiments. It is understood that changes and modifications can be made to the described exemplary embodiments without departing from the true scope and spirit of the subject disclosure as defined in the appended claims.

DETAILED DESCRIPTION OF EXEMPLARY EMBODIMENTS

The exemplary embodiments are based on the object of providing a novel apparatus and method for controlling the position of a fiber optic rotary junction (FORJ) for proper optical alignment during catheter connection to the patient interface unit (PIU). Torque for the FORJ is provided by a motor which is a servo-motor, and the position of the servo-motor is controlled by using a feedback signal that is direction-based. The method of controlling the motor includes using a binary feedback signal to move the servo-motor to a desired position in an oscillating back-and-forth manner. The method of controlling includes using the binary feedback signal to actively maintain the position of the servo-motor around the desired position until the servo-motor is stopped at the position. The method of controlling the servo-motor includes changing the direction of rotation of the motor back-and-forth around the desired position. The method of controlling the servo-motor includes rotating the motor towards and maintaining the position of the motor within a few degrees of the desired position without the use of an encoder. The method includes rotating the motor towards and maintaining the position of a servo-motor, such as BLDC motor, to an accuracy of within +/−2 degrees of the desired position without the use of an encoder.

<Imaging System>

An embodiment of the imaging system is described with reference to FIGS. 1A through 1D. According to one embodiment, the present disclosure is directed to an apparatus 100 comprising a motor 110 having a rotor portion 112 and a stator portion 114 arranged about an axis Ox. The rotor portion 112 is adapted to rotate relative to the stator portion in any of the two directions R1 or R2 about the axis Ox. A target 116 is affixed to the rotor portion 112 of the motor; the target 116 includes at least two distinguishable regions, a first region 116a and second region 116b. In FIG. 1A, the target 116 is a disc which includes at least an opaque part as the first region 116a and a transparent part as the second region 116b. A sensor 118 is affixed to the stator portion 114 of the motor; the sensor 118 is configured to detect which of the at least two regions 116a and 116b of the target is proximal to it. As shown in FIG. 1A, the motor includes a stationary sensor 118 and a rotating target 116. However, the attachment of the sensor 118 and the target 116 may also be reversed, so that the motor includes a rotating sensor 118 and a stationary target 116. The motor 110 can be configured to rotate a fiber connector 109 in any of the two rotational directions R1 or R2.

A motor controller (controller) 120 is configured to receive a signal 122 from the sensor 118 and to control the rotational direction of the rotor portion 112 of the motor 110 based on the sensor signal. That is, the controller 120, based on the signal 122 from the sensor 118, commands the motor to rotate in a certain direction. As described more in detail in later sections, unlike using a conventional encoder, the sensor 118 can only output a signal 122 corresponding to its proximity to one of the two detectable target regions. In one embodiment, the signal 122 can be a simple pulse signal having two different logical values (e.g., high and low), where each value corresponds to the sensor's proximity to the one of the two regions of the target. In other embodiments, the signal 122 can be composed of two different signals (e.g. a positive voltage signal +v, and a negative voltage signal −v), where each signal corresponds to the sensor's proximity to the one of the two regions of the target. A first signal from the sensor 118 indicating its proximity to the first of the at least two regions prompts the controller to cause the rotor portion to rotate in a first direction, and a second signal from the sensor 118 indicating its proximity to the second of the at least two regions prompts the controller 120 to cause the rotor portion to rotate in a second direction opposite to the first direction. In certain applications, the controller uses the first signal to rotate the motor in a clockwise direction and the second signal to rotate the motor is a counterclockwise direction. In other applications, the controller may use the first and second signals not only to change the direction of rotation, but also to change the direction and speed of rotation. It is noted here that, depending on the type of sensor used, the sensor 118 can be configured to actively detect its proximity to the target 116 and to emit a signal indicative of which one of the at least two distinguishable regions of the target is proximal to the sensor. This could be achieved, for example, with a Hall-effect sensor. However, active detection is not a requirement. As long as the sensor 118 is positioned in close proximity to the target and configured to emit a signal indicative of which one of the at least two distinguishable regions of the target is proximal to the sensor, the detecting or detection can be performed by other device (e.g., the controller). This is because the sensor 118 may not be smart enough to "know" whether it is proximal to the target or not, but as long as it is placed in close proximity to the target the sensor will generate one of the two possible signals depending on which one of the two distinguishable regions of the target is proximal to the sensor. If the sensor is not in close proximity (in front) of the target, it is possible that an optical sensor could still generate a certain signal (e.g., based on stray ambient light), but that signal cannot tell anything about the proximity to the target. Therefore, it is necessary that the sensor is positioned in close proximity to the target and configured to emit a signal indicative of which one of the at least two distinguishable regions of the target is proximal to the sensor, even if the sensor cannot actively detect its proximity to the target.

Also, the same system can work with a linear motor. In the case of a linear motor, the first direction can be a forward direction and the second direction can be backward direction. In this case too, as the motor moves in the forward direction or the backward direction, the sensor 118 can be configured to detect which of the at least two regions 116a and 116b of the target is proximal to it. Then, the motor controller (controller) 120 can be configured to receive a signal from the sensor 118 and to control the linear direction of the motor based on the sensor signal. A first signal from the sensor 118 indicating its proximity to the first of the at least two regions prompts the controller to cause the motor to move in a first direction, and a second signal from the sensor 118 indicating its proximity to the second of the at least two regions prompts the controller 120 to cause the motor to move in a second direction opposite to the first direction. In the case of linear motion, the target 116 should preferably extend in a linear direction and be shaped as an elongated rectangular key or a bar having two distinguishable regions (rather than a sector as in rotational motion). On the other hand, the requirements for a sensor to detect (and for a controller to control) the linear position are no different than for a rotational position control.

As described herein, the term "proximity" refers to a distance, in terms of physical space, of one element to another. In that regard, a first element may be considered in proximity (near or close) to a second element when the location of the first element can be detected by the second element or vice versa without the two elements having to actually contact each other. A practical example is a "proximity sensor" which performs non-contact detection by converting information on the movement or presence of an object into an electrical signal. There are several types of detection systems that can detect the movement or presence of an object by converting information into an electrical signal. Sensors that provide non-contact detection of target objects that are close-by or within the general vicinity of the sensor include inductive, capacitive, ultrasonic, optical, and magnetic sensors. In the present disclosure, an optical or photoelectric sensor configured to detect the proximity of a moving target is disclosed. In the present disclosure, to detect proximity, it is only necessary that one of the target and sensor moves relative to the other, and there is no limitation as to which one of the two moves relative to the other.

Figure 1B:
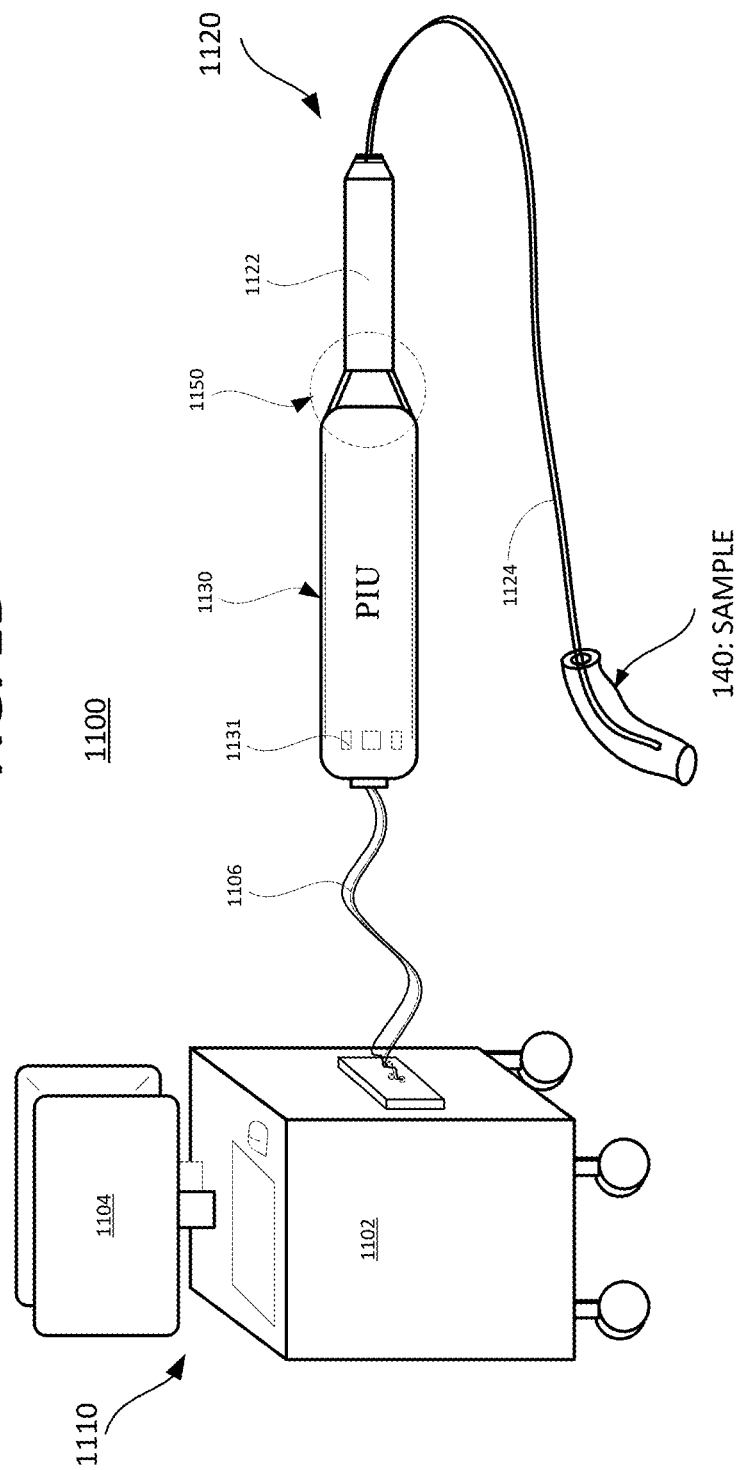
FIG. 1B shows an exemplary medical imaging system.

FIG. 1B shows an exemplary medical imaging system 1100 on which a motor and its position sensor can be implemented according to an embodiment of the present disclosure. The medical imaging system 1100 includes an imaging console 1110 and a mechanically rotated optical probe 1120 (e.g., endoscope or catheter). A patient interface unit (PIU) 1130 connects the optical probe 1120 to the imaging console 1110 using a cable bundle 1106. The imaging console 1110 includes, among other things, a computer cart 1102 and one or more displays 1104. The optical probe 1120 may include, for example, a fiber-optic based catheter 1124 and a catheter handle 1122. In an exemplary imaging procedure, the imaging system 1100 uses the catheter 1124 to obtain images of an imaging sample 140, such as a cardiovascular bodily lumen of a patient.

The PIU 1130 is the main interface between the catheter and the console 1110. The PIU 1130 provides the means to spin and linearly translate the catheter's imaging core within the catheter's stationary outer sheath. The console 1110 and PIU 1130 are connected by the PIU cable bundle 1106. The cable bundle 1106 houses therein cables for transmitting electrical power and for communication signaling, as well as optical fibers for light transmission. During use of the imaging system 1100, the entire PIU 1130 is preferably covered with a sterile drape and placed on the patient's bed or operating table. The PIU 1130 may provide a user interface for operating the imaging functions of the probe from an sterile field by the use of actionable buttons 1131; these buttons 131 may mirror other controls provided on a graphical user interface (GUI) at the imaging console 1110. The state of each button 1131 (e.g., active, inactive, warning, etc.) is communicated by indicator LEDs provided on the housing of the PIU; and these indicators too are mirrored on the GUI of display 1104. Therefore, users of the medical imaging system 1100 may perform the same operations from either a non-sterile field using the GUI in display 1104 or from the sterile field using the buttons 1131 on the PIU 1130.

The PIU 1130 (shown in detail in FIG. 2) is composed of a beam combiner 1230, a fiber optic rotary joint (FORJ) 1200, a motion mechanism including a rotational motor and a linear stage, electronic control boards, control buttons and/or an LED panel, and a catheter receptacle 1150.

Figure 1C:
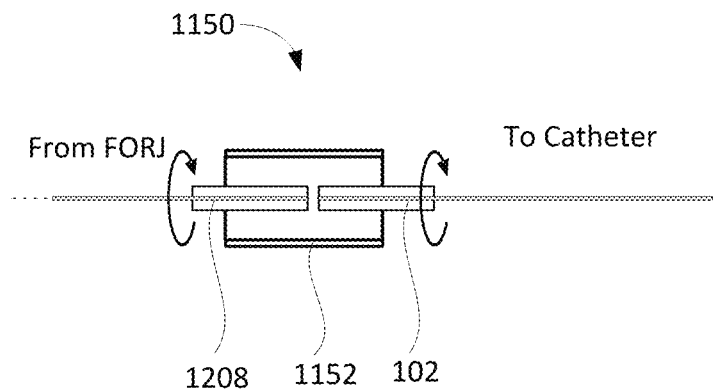
FIG. 1C shows an exemplary connection between a rotating fiber of the FORJ and a fiber of the optical probe.

FIG. 1C shows an exemplary representation of the catheter receptacle 1150 which aligns a rotating fiber 1208 of the FORJ with a fiber 102 of the optical probe 1120. Specifically, the catheter receptacle 1150 accepts the proximal portion of the catheter handle 1122, aligns it with the distal end of fiber 1208, and locks both ends in place using, for example, a fiber connector 1152 such as an MU adaptor or the like. An exemplary connector for engaging and disengaging a latchable fiber optic connector was disclosed by the applicant of the present application as described in U.S. Pat. No. 9,869,828 which is incorporated by reference herein in its entirety.

A secondary locking feature may be provided to prevent accidental catheter handle disconnection or optical misalignment during normal operation. This secondary locking feature can be an electronically controlled locking mechanism (e.g., an electromagnetic clutch) that can only be disengaged from the inside of the PIU using coordinated sequential motions of the spin motor and the linear stage. U.S. Pat. No. 9,345,398, which is incorporated by reference herein, describes various examples of a locking mechanism configured to lock a handle of the imaging catheter to a drive assembly. The PIU may also include a manually operated, user accessible, emergency catheter-lock deactivation mechanism such as a lever (not shown). A rotary joint base is mounted within the PIU housing 1132 on a set of vibration-isolating mounts 1137 to improve stability during rotation and to increase PIU durability. During imaging operations, the PIU 1130 and its components are mainly operated by electronic control commands issued by one or more non-sterile users operating the imaging console 1110 while a physician (sterile user) maneuvers the imaging probe 1120 to treat a patient.

Figure 1D:
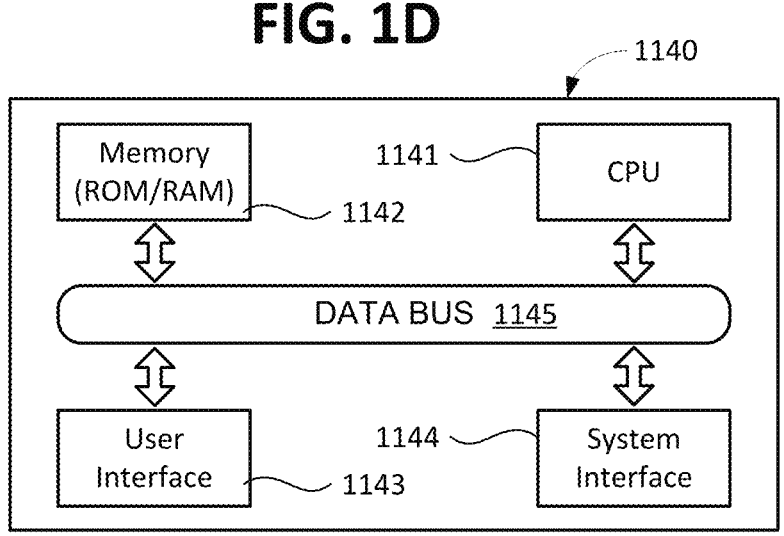
FIG. 1D illustrates a functional diagram of a computer applicable to the imaging system.

FIG. 1D illustrates a functional diagram of a computer 1140 applicable to the imaging console 1110. As shown in FIG. 1D, the computer 1140 may include, among other things, a central processing unit (CPU) 1141, a storage memory (RAM) 1142, a user input/output (I/O) interface 1143, and a system interface 1144 which are operatively interconnected via a data bus 1145. The computer 1140 can programmed to issue a command that can be transmitted to the various parts of the imaging system 1100 upon receiving a user input via the user interface 1143. A touch panel screen in the display 1104 can be included as part of the user interface 1143, but key board, mouse, joy-stick, ball controller, and foot pedal can also be included. Using the user interface 1143, the user can cause a command to be initiated to observe inside a lumen of a human body through the exemplary imaging system 1100. For example, when the user inputs a command via the user interface 1143, the command is transmitted to the central processing unit CPU 1141 for execution thereby causing the CPU 1141 to issue a command via the system interface 1144 to one or more of a light source (not shown), a detector/spectrometer (not shown), or the PIU 1130.

The CPU 1140 includes one or more processors (microprocessors) configured to read and perform computer-executable instructions stored in the storage memory 1142. The computer-executable instructions may include program code for the performance of the novel processes, methods and/or calculations disclosed herein.

The computer 1140 can be programmed to apply exemplary image processing such as noise reduction, coordinate distortion correction, contrast enhancement and so on. After or even during the image processing is performed, the data can be transmitted from the image processor to the one or more displays 1104. A liquid crystal display (LCD) can be used as the display 1104.

The CPU 1140 is configured to read and perform computer-executable instructions stored in the storage memory 1142. The computer-executable instructions may include those for the performance of the methods, measurements, and/or calculations described herein.

The storage memory 1142 includes one or more computer readable and/or writable media, which may include, for example, a magnetic disc (e.g., a hard disk), an optical disc (e.g., a DVD, a Blu-ray), a magneto-optical disk, semiconductor memory (e.g., a non-volatile memory card, flash memory, a solid state drive, SRAM, DRAM), an EPROM, an EEPROM, etc. Storage memory (RAM) 1142 may store computer-readable data and/or computer-executable instructions.

The system interface 1144 provides electronic communication interface to input and output devices, which may include a keyboard, a display, a mouse, a printing device, a touch screen, a light pen, an optical storage device, a scanner, a microphone, a camera, a drive, communication cable and a network (either wired or wireless).

The imaging console 1110 for the embodiment of the probe 1120 uses optical energy generated by a non-illustrated light source, such as a laser source, to irradiate a luminal sample 140. The imaging console 1110 includes a data-processing computer configured to receive data representing energy (optical energy) delivered to and/or collected from the luminal sample 140. The patient unit interface (PIU) is configured to detachably connect the imaging probe 1120 to the imaging console 1110. To that end, the imaging system 1100 can have various arrangements, and may use a known fiber optic rotary joint (FORJ). In addition, according to the present disclosure, it is advantageous to include a sensor configured to detect a rotational position of the rotatable portion of the fiber optic rotary junction; and a controller configured to use the sensor signal to control the rotational direction of the motor to facilitate engagement and disengagement of the imaging probe 1120 to the PIU 1130.

The imaging operation of the imaging system 1100 can be based on interferometric methods known as Optical Coherence Tomography (OCT). Exemplary methods of OCT imaging that are described in U.S. Pat. Nos. 5,321,501, 6,134,003, and 7,515,265, all which are incorporated by reference herein in their entirety, can be applied for the purpose of implementing OCT imaging with an imaging probe. However, the image system is not limited to OCT imaging, the imaging operation of the imaging system 1100 can be based on non-interferometric imaging methods such as spectrally encoded endoscopy (SEE), such as those described in U.S. Pat. No. 9,846,940 and U.S. patent Ser. No. 10/095,020 which are incorporated by reference herein in their entirety.

<FORJ Drive Assembly>

Figure 2:
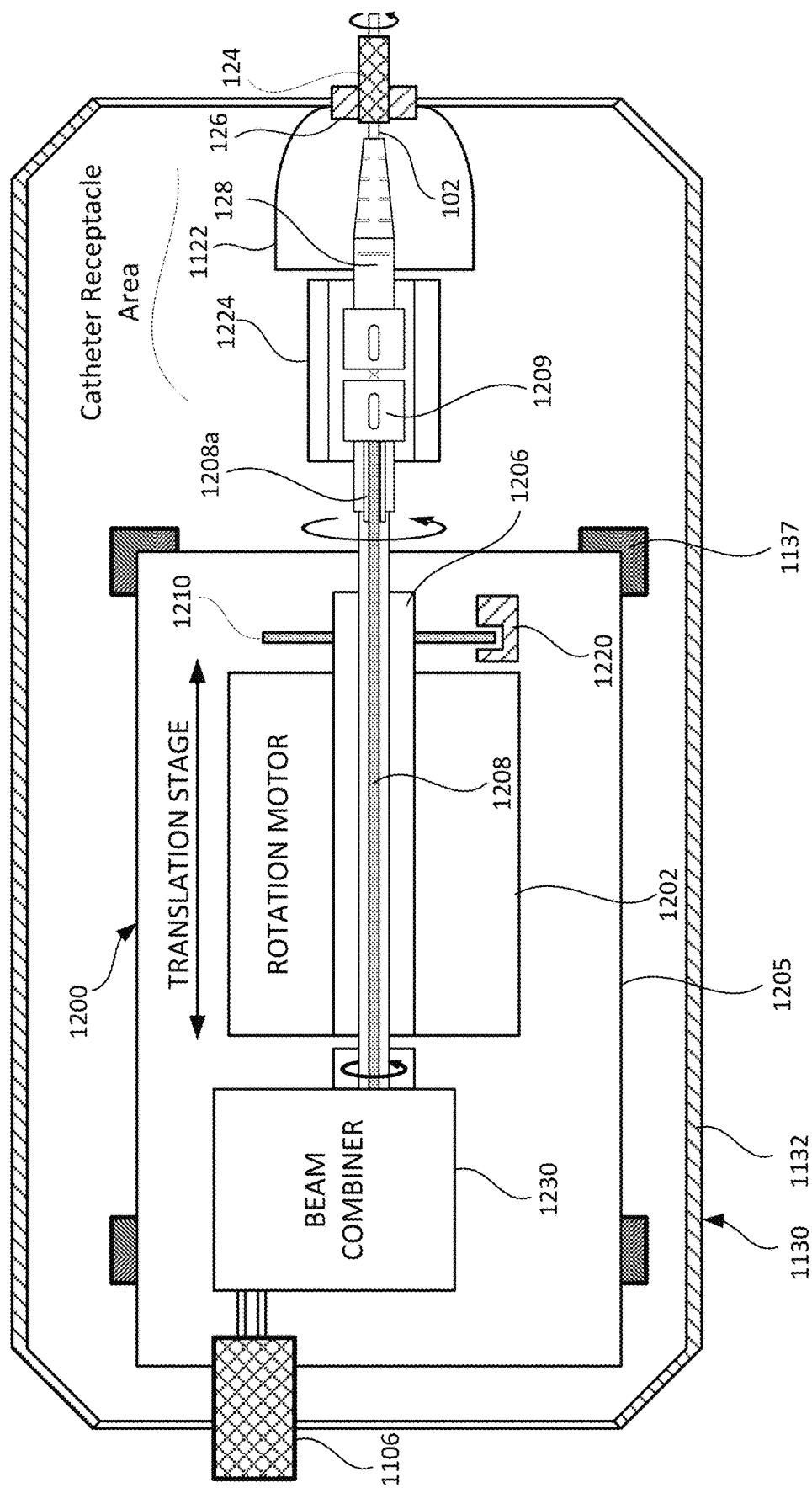
FIG. 2 illustrates an exemplary embodiment of a patient unit interface (PIU) including a fiber optic rotary joint (FORJ).

FIG. 2 illustrates an exemplary embodiment of PIU 1130 including a fiber optic rotary joint (FORJ) 1200. The PIU 1130 is formed of a solid base 1132 with sufficient space to arrange therein mechanical, electronic, and optical systems for driving the optical probe of the imaging modality. The fiber optic rotary junction 1200 has a stationary portion (stator) with a stationary fiber (not shown) connected to a beam combiner 1230 and a rotatable portion with a rotatable fiber 1208. The rotatable fiber 1208 transmits light between the beam combiner 1230 and the proximal end of the optical probe 1120. The catheter receptacle and locking mechanism are arranged in a catheter receptacle inside the PIU housing 1132. A linear translation stage 1205 is attached to the vibration-isolating mounts 1137 so at to provide accurate alignment between FORJ 1200 and the catheter handle 1122.

The FORJ 1200 provides optical coupling between a stationary beam combiner 1230 and the rotating optical fiber 1208, as well as optical and mechanical coupling between the rotating optical fiber 1208 and the catheter handle 1122. In one embodiment, the rotating optical fiber 1208 is positioned in the bore of a hollow shaft 1206 of a spin motor 1202. The spin motor 1202 can be a BLDC motor, a step motor, or any other type of suitable servo-motor capable of receiving a direction-based feedback signal. The rotating fiber 1208 is collimated on the beam combiner side and connectorized on the catheter connection side. To that end, on the catheter side, the fiber 1208 is terminated with a sleeve 1208a and a fiber connector 1209. Ball bearings (not shown) may be used to hold the sleeve 1208a inside of, and centered with, the hollow shaft 1206. A field replaceable fiber connector 1224 is used to connect the distal end of rotating fiber 1208 to the catheter optical connector 128. The spin motor 1202 is mounted on a rigid support and is precisely aligned and fixed to the beam combiner 1230. The entire rotary joint is mounted on a moving platform of a linear translation stage 1205. Actuation of the linear translation stage 1205 allows for pullback withdrawal and subsequent advancing of the rotating catheter's imaging core during an imaging procedure. In this embodiment, to monitor direction of rotation, the FORJ includes a sensor 1220 and a target 1210. The sensor 1220 can be fixed to the stator portion or to the chassis of the motor 1202. The target 1210 can be a wheel or disc mounted on the hollow shaft 1206 of spin motor 1202. The sensor 1220 can be a slot sensor or an optical fork sensor or an LED/photodiode pair configured to detect one or more marks or regions of the wheel or disc as it passes in front of the sensor during rotation.

The optical probe 1120 includes, arranged in order from at its proximal end to the distal end, along the probe axis, at least a fiber connector 128, an optical fiber 102, and an assembly of distal optics (not shown). The optical probe 1120 also includes an outer sheath 126 (preferably a transparent outer sheath made of medical grade low friction material), and a drive coil 124. The drive coil 124 contains thereinside at least the optical fiber 102 and the non-illustrated distal optics assembly. The optical probe 1120 is connected at its proximal end thereof to the rotatable portion of the fiber optic rotary junction 1200 via the field replaceable connector 1224 which engages with the fiber connector 128 on the catheter side and with the connector 1209 of rotating fiber 1208 on the FORJ side. Alternatively, on the FORJ side, the field replaceable connector 1224 may engage directly with the hollow shaft 1206. Regardless of how the connector 1224 connects the rotating fiber 1208 to the catheter connector 128, the fiber optic rotary joint 1200 transfers rotational torque from the spinning motor 1202 to the distal end of the optical probe 1120 by rotating the drive coil 124.

The working principle of a motor having a hollow core (e.g., spin motor 1202) is well known to a person having ordinary skill in the art. For this exemplary embodiment, the hollow shaft 1206 of spin motor 1202 has an inner diameter large enough to fit therethrough the outer diameter of the rotating fiber 1208 and any necessary protective material (e.g., a sheath). Since the rotating fiber 1208 is terminated with a sleeve 1208a which is held inside the hollow shaft 1206, the motor 1202 rotatably drives the fiber 1208 at a very stable high speed of rotation. To connect to the field replaceable connector 1224, the distal end of the hollow shaft 1206 (the end facing the catheter connector) may be implemented as a threaded hollow tube or as a female type-C connector. The hollow shaft 1206 of spinning motor 1202 and the drive cable 124 are used to rotate the fiber 102 along with the core optics necessary for imaging the sample 140.

During an imaging procedure, the catheter needs to be mechanically connected to the PIU in a secure manner. This connection is generally performed manually by a user of the system. In addition to a mechanical connection, the optical probe of the catheter needs to engage and align with other optical elements in the PIU (namely with the rotating fiber 1208) to ensure proper transmission of light between the console and the catheter. Therefore, ensuring proper connection of the optical probe to the PIU is important in order to recognize the connection status thereof before using the catheter in a patient. In this manner, when an unexpected misalignment or disconnection occurs, the console 1110 can be enabled to alert medical personnel of potential errors.

In an imaging operation, after a user manually connects the proximal end of the optical probe 1120 (a catheter) to the PIU 1130, the mechanical connection (the physical present of the catheter) is detected with a sensor such as touch sensors, optical sensors, and/or pressure sensors (not shown). The mechanical connection detected by a sensor is converted to an electrical signal, and then the electrical signal is transferred to the imaging console 1110 of the imaging system 1100 to recognize the catheter handle connection by executing software instructions with the CPU of computer 1140. Specifically, the CPU of computer 1140 may run a macro which confirms whether or not the catheter has been mechanically connected to the PIU. In the case that the computer 1140 confirms the catheter has been mechanically connected to the PIU, the controller of the PIU controls the spin motor 1202 to initiate rotation of fiber 1208. At this point, an optical alignment process is automatically initiated by the system console 1110 without intervention from the user. To ensure proper optical alignment, however, it is necessary to determine the rotational position of the rotating fiber 1208 with respect to the orientation of the optical connector 128 of the optical probe 1120. As already mentioned above, there are known schemes that use encoders to determine the rotational position of the spinning motor. However, the known techniques use cumbersome and expensive arrangements that take-up space in the PIU, and such known techniques are also data intensive.

The present disclosure improves on the known techniques by a novel apparatus and method using a simple sensor configured to detect its own proximity to moving target which has at least two distinguishable portions; and a controller configured to control the rotational direction of the motor based on the signal from the sensor. The controller uses the sensor signal as a feedback signal to move a servo-motor to a desired position in an oscillating back-and-forth manner until the motor reaches within a few degrees (two or less degrees) of a predetermined position. In some embodiments or in some applications, the degrees of accuracy can be variable to within +/−5, +/−4, +/−3, +/−2, or +/−1 degrees of the predetermined rotational position. In experiments carried out by the inventors herein, motor oscillations around +/−1 degree of the desired position were achieved. However, a higher accuracy of control, including motor oscillations to about zero degrees of a desired position may be achieved with faster processing. Qualitatively, the control mechanism was found to be very stable and robust. This is considered a significant advantage over conventional control techniques where PID loops for typical position control can be unstable and must be tuned appropriately.

<Target Structure>

Figure 3A:
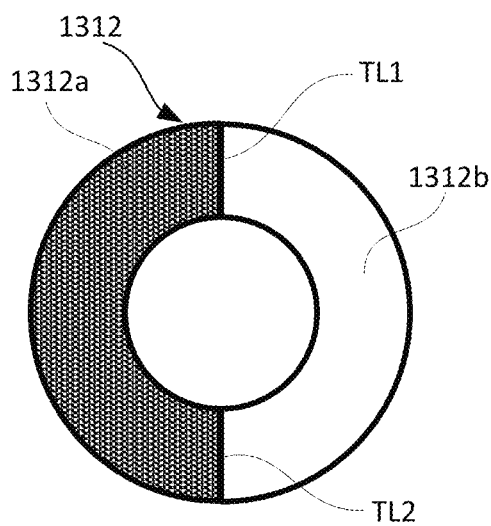
FIGS. 3A, 3B, 3C, and 3D show exemplary embodiments of a target implemented as a rotating wheel or disc usable for detecting a rotational position of the motor with a sensor.
Figure 3B:
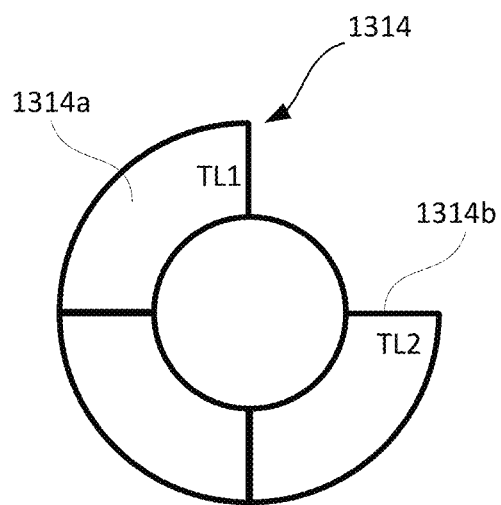
Figure 3C:
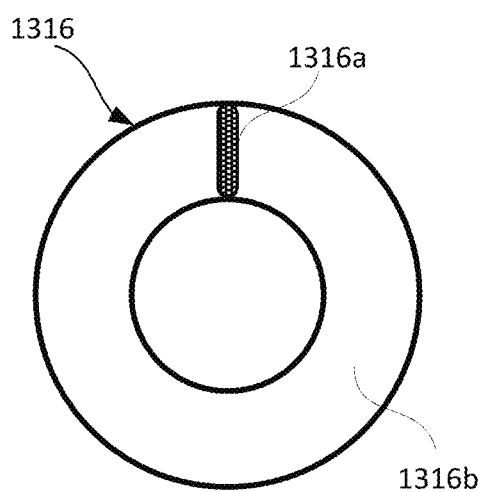
Figure 3D:
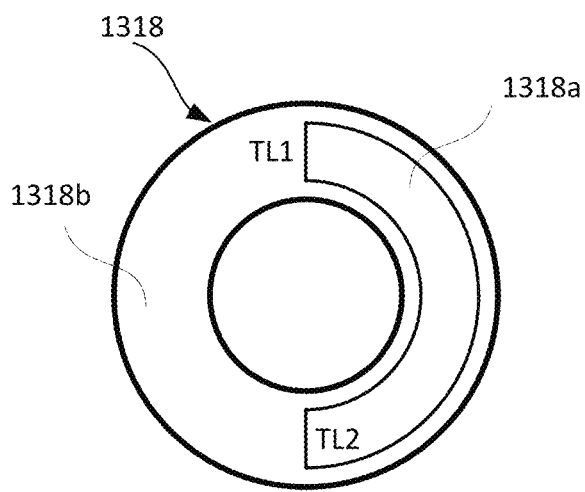

FIGS. 3A, 3B, 3C, and 3D show some exemplary embodiments of the target 1210 (shown in FIG. 2). In the present disclosure, the target 1210 can be implemented as the two-position disc or two-color wheel, as illustrated in FIG. 1A. Alternatively, the target 12010 can be implemented as a binary flag, a two-point position indicator, or any other rotating element having one or two markers indicative of a rotational position. The rotating element and markers therein used as the target 1210 are not limited to any specific shape or material. Furthermore, as long as one or two positions are detectable, the markers can be at any location and any distance from each other along a given circumference. FIG. 3A shows an example of such mechanism where a two-color wheel 1312 represents the target 1210 shown in FIG. 2. The wheel 1312 has two distinguishable regions; a first region 1312a which can have a non-transparent color (e.g., opaque or black) and a second region 1312b which can be clear or transparent. Each distinguishable region is separated from an adjacent one by a clearly demarked boundary. In FIG. 3A, a first boundary TL1 and a second boundary TL2 respectively demarks a transition from the first region 1312a to the second region 1312b (or vice versa) depending on the direction of rotation of the motor. As the color wheel 1312 rotates, an LED/photodiode pair (sensor) mounted below the wheel measures the transmission of light through the transparent part, and outputs a sensor signal corresponding to the light intensity level. FIG. 3B shows another embodiment of the target implemented as a two-position disc 1314. In FIG. 3B, the disc 1314 includes two distinguishable regions: a first region 1314a which can be made of solid material (e.g., metal or non-transparent plastic) and a second region 1314b which can be a part of the disc cutoff to allow transmission of light therethrough. FIG. 3C shows another embodiment of a target implemented as a disc 1316 with two distinguishable regions. In FIG. 3C, the disc 1316 includes a first region 1316a which can be of transmissive, reflective, or fluorescent material having a predetermined size and a second region 1316b which can be of a different material and size from that of the first region. In FIG. 3C, a one position can be indicated by detecting the intensity of light reflected, transmitted, fluoresced by the first region 1316a during rotation of the disc 1316. FIG. 3D shows a target implemented as a two-position disc 1318; the disc 1318 includes a first region 1318a and a second region 1318b. In this case, the disc 1318 includes a first slotted region (first region 1318a) and a second solid region (second region 1318b). As can be understood from the drawing, the disc 1318 of FIG. 3D is functionally similar to the wheel 1312 of FIG. 3A, with the exception that disc 1318 may be metallic disc having a cutout semicircular region 1318a and a solid semicircular region 1318b. In any and all of the examples of FIGS. 3A-3D, as the target rotates, the sensor (e.g., a magnetic slot sensor, an optical fork sensor, or an LED/photodiode pair, etc.) mounted below the wheel measures the intensity of light transmitted through (or reflected by) one or more regions of the target, and produces a two-level (high/low) signal indicative of two positions of rotation of the spin motor 1202. More specifically, as the motor rotates, the sensor 1220 detects its proximity to one of the two distinguishable regions of the target 1210, and outputs a signal indicative of which one of the two regions the sensor is closest to.

<Feedback Loop>

Since the sensor 1220 continuously detects its proximity to the rotating target 1210, the photodiode response (high or low) depends on the position of the rotating target, whether the photodiode sees the clear or dark part of the wheel. With this specific implementation, the spin motor 1202 can be sensed at one position, or at most at only two different positions, corresponding to the transitions through boundaries TL1 and TL2 between the clear and dark regions on the rotating disc or wheel. Naturally, more than two transitions can be provided depending on control needs. For example, with the target 1314 of FIG. 13B, four transitions (one for each 90-degree quadrant) could be provided if each quadrant of target 1314 provides a different output signal.

The type of feedback that is presented in this disclosure differs radically from the conventional potentiometer, encoder, or Hall sensors. In the present disclosure, the sensor provides a signal to the motor controller only enabling position control around one (or two) specific position(s). Contrary to encoder and Hall sensors which track down the motor position wherever it may be, the current approach is to provide the controller only with the sensor signal of one or at most two rotational positions, whereby the controller uses the sensor signal in a feedback look to control the direction that the motor should move towards. So, the current approach does not provide position feedback per se, but rather it provides a sensor signal indicative of the sensor's proximity to a positional target, and the sensor signal is used as direction feedback to control the motor's direction of movement. What is called "direction feedback" in the present disclosure is a feedback that leads to the motor controller selecting a direction of rotation rather than reporting rotor position. As a motor can only move in two possible directions clockwise (CW) or counter clockwise (CCW) for a rotary motor, or forward (FWD) and backward (BWD) for a linear motor, the feedback is substantially similar to a binary switch-type feedback with only two logic levels, high or low. The desired position corresponds to the position where the logic level switches from one level to the other.

The following table (Table 1) outlines some of the differences between a typical encoder feedback and the direction feedback provided by the sensor of the present disclosure.

| Typical feedback | Provides | Present disclosure | Provides |
|---|---|---|---|
| Encoder, Hall sensor, etc. | High resolution detection, large footprint sensor, complex circuit electronics | One or two position sensor | Low resolution, small footprint sensor, simplified (binary) circuit electronics |
| Positon feedback signal | Accuracy < 1 deg. | Direction feedback | Accuracy in a range of about zero to 2 deg. |
| Quadrature A/B output | Intensive data processing | High/low binary signal | Minimal processing |

The present disclosure does not limit the manner in which the direction feedback switch-type signal is generated. It can be done mechanically, optically or any other methods. The following embodiments of control process are non-limiting examples.

Figure 4:
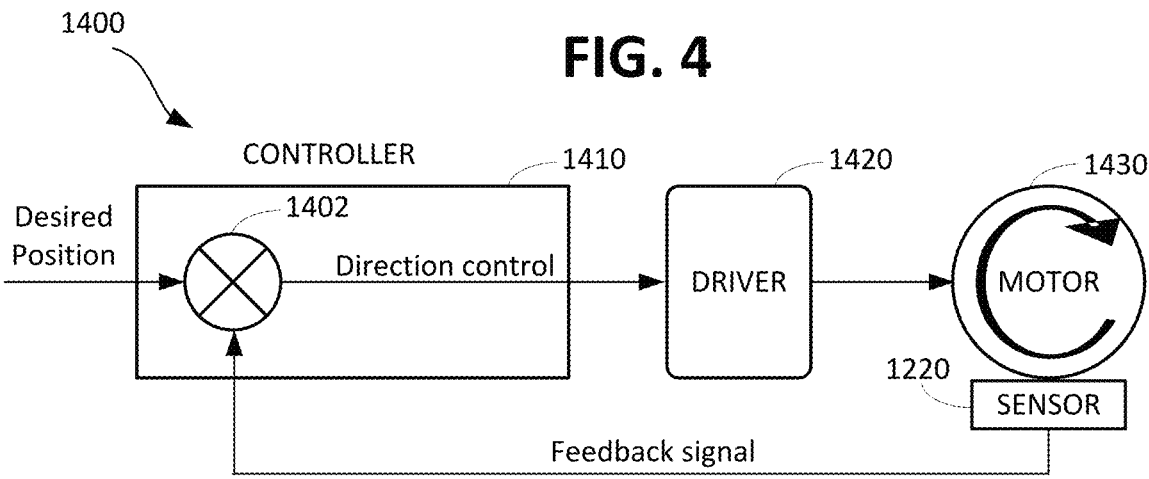
FIG. 4 shows an exemplary block diagram of a feedback circuit to provide servo-to-edge directional motor feedback to the FORJ.

FIG. 4 shows an exemplary block diagram 1400 of the functional blocks utilized to provide servo-to-edge directional motor feedback to the FORJ. The word "servo" defines following (or servicing) the command input. In servo feedback, the electric drive control unit (controller) should control the motor to perform a specified task. The task may be adjustable current or voltage control or speed control or position control. The drive command may be operated in simple open loop control without considering an actual control parameter. However, in order to obtain precision and accuracy, the particular control parameter actual information is observed through a specific sensor to perform closed loop control.

The principle of operation to control the servo-motor is similar to any other servo-type mechanism, in the sense that a control loop must be devised to link input and output so as to servo (follow) the motor and achieve position control. However, in the present disclosure, the block diagram 1400 does not achieve position control per se, but rather rotational control with respect to a desired (set/reference) position. In FIG. 4, a sensor (e.g., sensor 1220) monitors the rotational position of a motor 1430 (e.g., spin motor 1202 in FIG. 2) with respect to a given (set/reference) position. The sensor monitors rotational position by detecting its proximity to at least one of the two distinguishable regions (or markers) of the target. The sensor 1220 provides an output signal based on the actual (current) rotational position of the motor 1430 at a given time. The desired position (set point), which can obtained from any reference point, is used as a crossing point to change (flip) the rotational direction of the motor using a main controller 1410 based on the output signal provided by the sensor 1220.

More specifically, referring back to FIG. 2, in the procedure of connecting a catheter 124 to the PIU 1130, the fiber connector 128 of the catheter is generally inserted in a predetermined orientation. For example, the catheter is connected to the PIU 1130 with the fiber connector 128 aligned to a predetermined orientation (e.g., with its locking or snap ridge pointing vertically upwards, downwards, or sideways). Therefore, in order to properly align the rotating fiber 1208 of FORJ 1200 with the fiber connector 128 being inserted, the spin motor 1202 can use the orientation of the connector 128 as a reference point to know where to stop the rotating fiber 1208 before engaging and aligning. In this regard, an example of a predetermined rotational position, as described herein, can be a desired orientation in which the proximal end of the catheter is inserted into the PIU 1130. Another example of a predetermined rotational position could be the motor's back-EMF zero-crossing position. In other embodiments, the predetermined rotational position may be any fixed reference point with respect to which a rotational position of the motor can established without an actual encoder, and within a certain degree of accuracy.

Referring now again to FIG. 4, in the main controller 1410, a comparator circuit 1402 receives the output signal from sensor 1220 and uses that signal as a feedback signal of a control loop. Specifically, the comparator circuit 1402 compares the feedback signal (indicative of the current direction of rotation) to a previously read direction of rotation. As explained below in reference to FIG. 5, the feedback signal is a binary signal that takes the value of high (+) if the rotation direction is clockwise, or takes the value of low (−) if the rotation direction is counterclockwise. Therefore, in the block diagram of FIG. 4, the comparator circuit 1402 acts essentially as a switch that receives the sensor signal, determines whether the signal is HIGH or LOW, and compares it to the desired position, and reverses the direction of rotation depending on HIGH or LOW level of the signal. The driver 1420 drives the motor 1430 according to the "direction control" signal provided by the controller 1410. Specifically, the driver 1420 controls the motor rotational direction causing it to either continue rotating in the same direction or to change the direction of rotation. The reversal of direction will change back-and-forth every time the motor crosses the desired position (or set point).

In a conventional application, an encoder or Hall sensor provides the feedback signal (position input) based on the actual motor position. This position feedback is compared to the desired position, which gives the positional error, which is input to the servo control loop. The error then goes through a PID control block whose output drives the motor with a signal which is a function of the error. The output signal can for example be the drive voltage or current to the motor. When the motor is at the desired position, the position error is zero. In that case, the servo-loop is balanced and no output is driven to the motor. However, the servo-loop becomes active if the motor deviates from its desired position. The amount, magnitude, or level of the output signal (controlled by the PID function) is a function of the magnitude of error.

In the present disclosure, unlike the conventional methods, because the feedback is not based on exact positional information, but in a sensor signal having only two logic levels, the control logic is very much different and simpler. A major difference in the present disclosure is that the control loop is never balanced and the motor is always required to either move in one direction or the other. The motor is therefore servoed around the transition between the two logic levels, which leads to an oscillating back-and-forth type of motion around the desired position. An advantage of this type of servo-feedback is that a PID controller is not required because the motor is not controlled as function of a positional error. Instead, since the feedback signal is merely used to reverse the rotational direction of the motor based on the sensor's ability to detect its own proximity to the target, the processing time is faster, the electronic control is simpler, and the positioning accuracy is not exact but is guaranteed to within a few degrees (approximately +/−1 degrees) of the desired position. Notably, this level of accuracy is achieved with a simplified circuit structure without the use of an encoder and related hardware because the motor repeatedly oscillates around the desired position.

<Control Logic>

Figure 5:
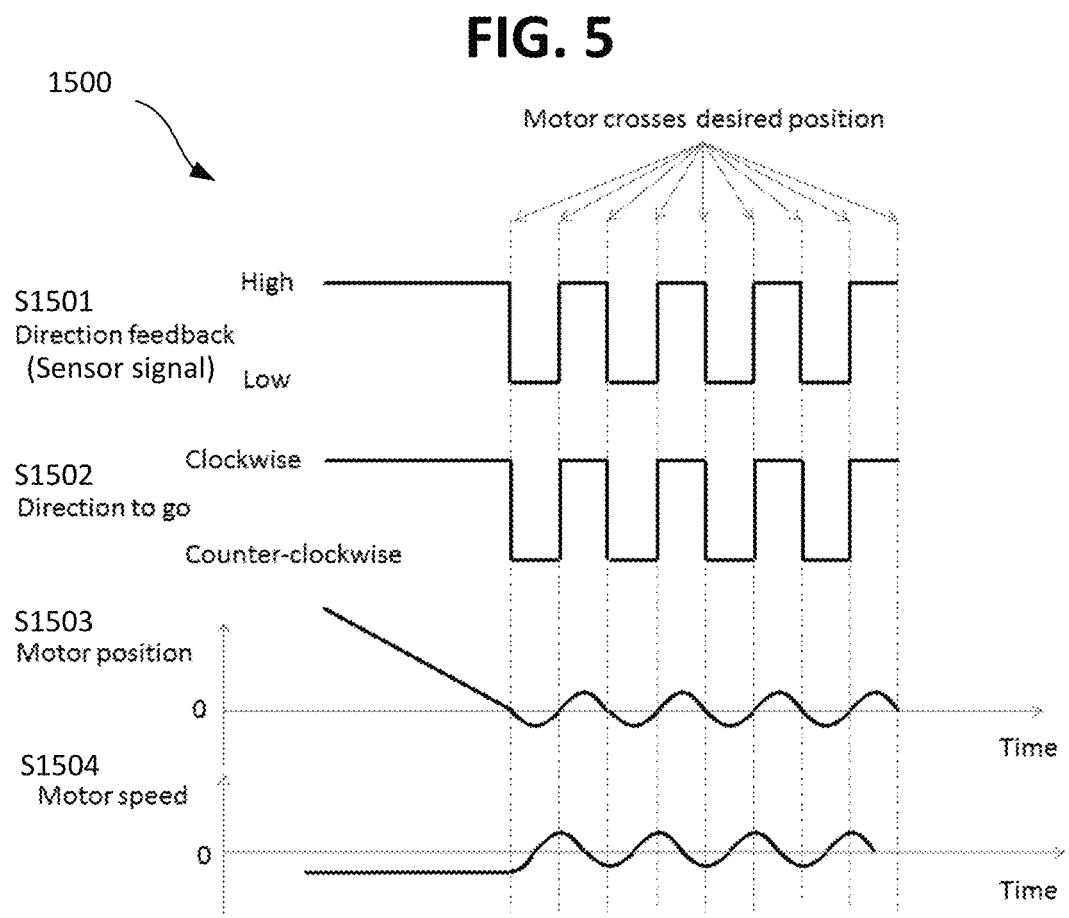
FIG. 5 shows an exemplary embodiment of control logic for providing servo-to-edge directional motor feedback to the FORJ.

FIG. 5 shows an exemplary embodiment of the control logic over time. FIG. 5 displays schematically 3 different signals S1501, S1502, and S1503 corresponding to the servo-to-edge control loop.

Signal S1501 is the direction feedback, which corresponds to the input to the control loop. The direction feedback (signal S1501) changes from "High" to "Low" every time the motor crosses a desired position. That is, every time the sensor 1220 detects its own proximity to the target 1210, which is based on the passage of one of the regions of the target 1210 in front of sensor 1220, the signal S1501 changes its logical level;

Signal S1502 is the motor requested "direction to go", which relates to the output (drive signal) of the control loop;

Signal S1503 is the motor position itself. That is the rotational position with respect to the desired position (or crossing point);

Signal S1504 is the motor speed as a function of time. Initially, the motor rotates at a substantially constant speed. Then, when a direction feedback signal (S1501) is active, the motor speed oscillates as it decelerates and accelerates each time the motor crosses the desired position.

As shown in Signal S1503 of FIG. 5, initially, the motor is positioned randomly and the motor position deviates greatly from the desired position (marked as position zero). As time progresses (horizontal axis), based on the initial direction feedback, the motor is commanded to move towards the desired position (towards the zero value in signal S1503). Once the motor crosses that desired position (zero value), the direction input signal S1502 (direction to go) changes its logical value. This triggers the control loop to reverse the direction of the movement direction of the motor. In order to reverse its direction, the motor must first slow down before moving in the reverse direction. This is reflected in the motor speed signal. At the same time, the motor position signal (S1503) initially overshoots the desired position (until the motor slows down) before going back towards the desired position (zero value). Therefore, the motor position signal S1503 traces a sinusoidal curve when the feedback loop is activated. The motor speed signal S1504 would be the derivative of signal S1503. Specifically, the signal S1504 would also be a sinusoidal-type curve, but the speed maximum values would occur when the motor crosses the desired position, and the speed minimum values (zero positions) would be when the motor is done slowing down and starts going back towards the desired position. The cycle of the two sinusoidal signals is out of phase by approximately π/2, and is continued as long as desired. In the end, the control mechanism achieves an oscillating back-and-forth type of motion around the desired position until the motor is stopped (manually or automatically).

This type of control can be advantageously implemented on a BLDC motor shown in FIG. 2 where a two-color wheel and an LED/photodiode pair can provide the two-level signal, and where the motor can be current-controlled or voltage-controlled to repeatedly change its rotational direction. However, the present disclosure does not limit the manner in which the direction feedback switch-type signal is generated. As long as it is a binary signal, the feedback signal can be generated electromechanically, optically or any other methods known to those skilled in the art.

Figure 6:
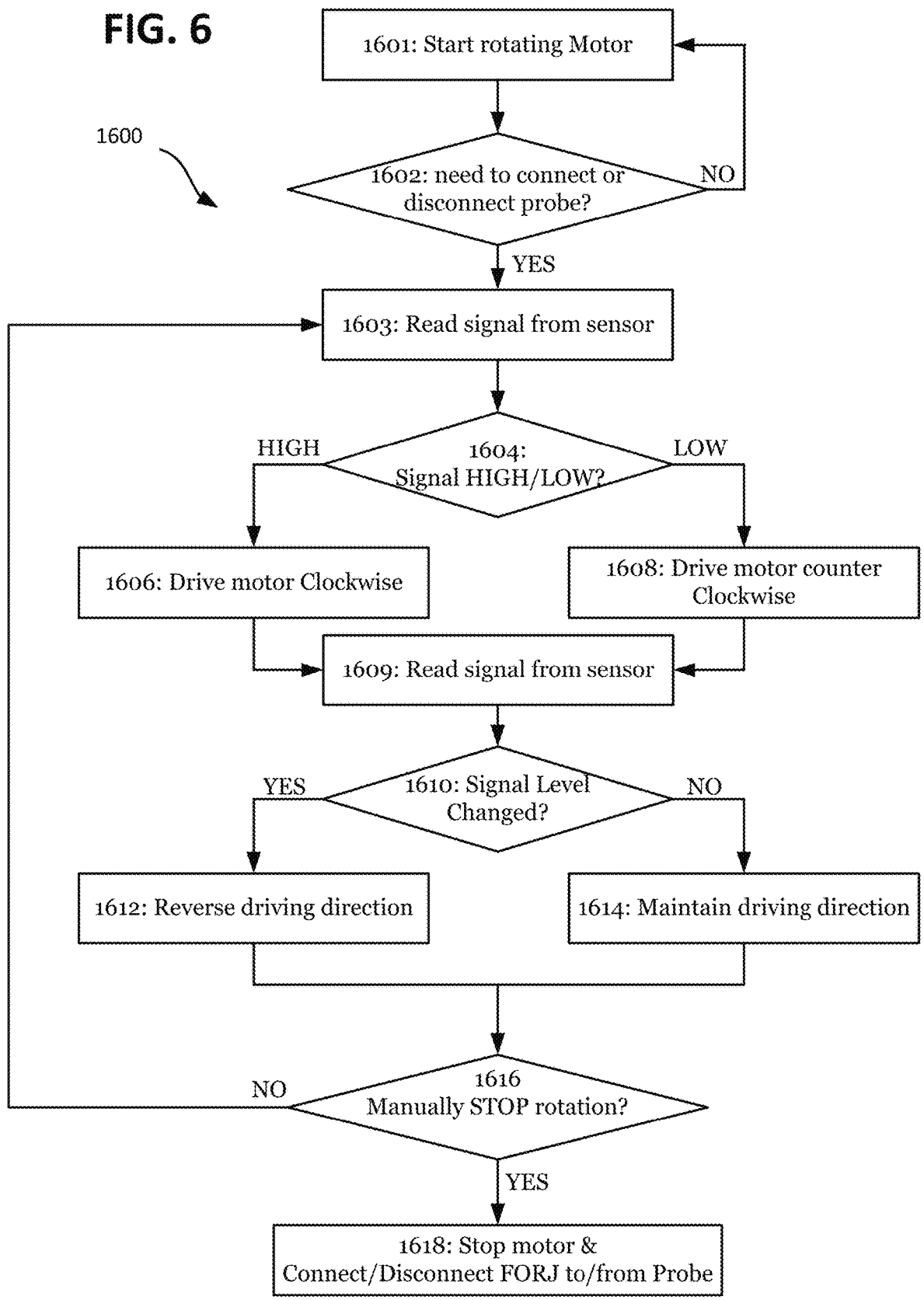
FIG. 6 shows an exemplary control process (method) of controlling a rotational position of a fiber optic rotary junction (FORJ) using servo-to-edge feedback and manually stopping the FORJ at a desired position.

FIG. 6 shows a flowchart 1600 of the control mechanism that can be implemented using the position-feedback servo-loop shown in FIG. 4. This type of control was implemented by the inventors in a BLDC motor shown in FIG. 1A where the wheel target 116 and photodiode-based sensor 118 provided the feedback signal 112 and where the motor 110 was current-controlled. At step 1601 of FIG. 6, it is assumed the spin motor 1202 (see FIG. 2) of FORJ 1200 is placed in an operating (rotating) state. At step 1602, the system waits until a command for connecting (or disconnecting) the optical probe 1120 to (from) the PIU 1130 is entered. At step 1603, initially, the system reads the signal from sensor 1220. At step 1604, the controller 1410 (or a processor) determines whether the sensor signal level is high or low. Based on that value (high or low), the controller issues a "direction control" command to the motor to rotate in either clockwise or counter-clockwise direction. The loop can also be adapted to a linear motor (e.g., stepping motor), where the motor moves forward or backward in case of a linear motor. As a result, the rotational position of the motor will advance towards the desired position, but not necessarily stop. Specifically, if at 1604, the controller determines the sensor signal is HIGH, the loop proceeds to step 1606, which means that the controller drives the motor in a clockwise direction (first direction). On the other hand, if at step 1604, the controller determines the sensor signal is LOW, the loop proceeds to step 1608, which means that the controller drives the motor in a counter-clockwise (second direction opposite to the first direction).

Regardless of the direction in which the motor is initially driven, as time progresses, the controller continues to read the signal from the sensor at step 1609, and checks at step 1610 whether the sensor signal level has changed. If at step 1610, the signal level has changed from high to low or vice versa (YES at 1610), the loop proceeds to step 1612 where the controller changes the driving direction of the motor (the direction is reversed). If at step 1610, the sensor signal level has not changed (NO at 1610), the loop proceeds to step 1614 where the controller maintains the driving direction of the motor.

Subsequently, the controller transitions the control loop to step 1616 and prompts the user whether to stop the motor. If no input from a user is received, the loop returns to step 1602 so as to reverse direction when a transition of the sensor signal occurs. That is, the control loop of flowchart 1600 continuously monitors and reverses the direction of rotation of the motor to maintain the position of the motor oscillating back-and-forth around the desired position, until the user manually requests to stop the motor (YES at step 1616). Once the user chooses to manually stop rotation of the motor (e.g., by operating GUI controls at the console 1110 or buttons 1131 at the PIU), in step 1618, the spin motor 1202 stops and the FORJ 1200 connects with probe 1120, by for example moving the translation stage 1205 (together with entire FORJ) linearly towards the catheter receptacle area.

The control loop of FIG. 6 can be modified, for example, to either prompt the user to stop the motor or to automatically cause the motor to stop after a predetermined number of back-and-forth oscillations.

Figure 7:
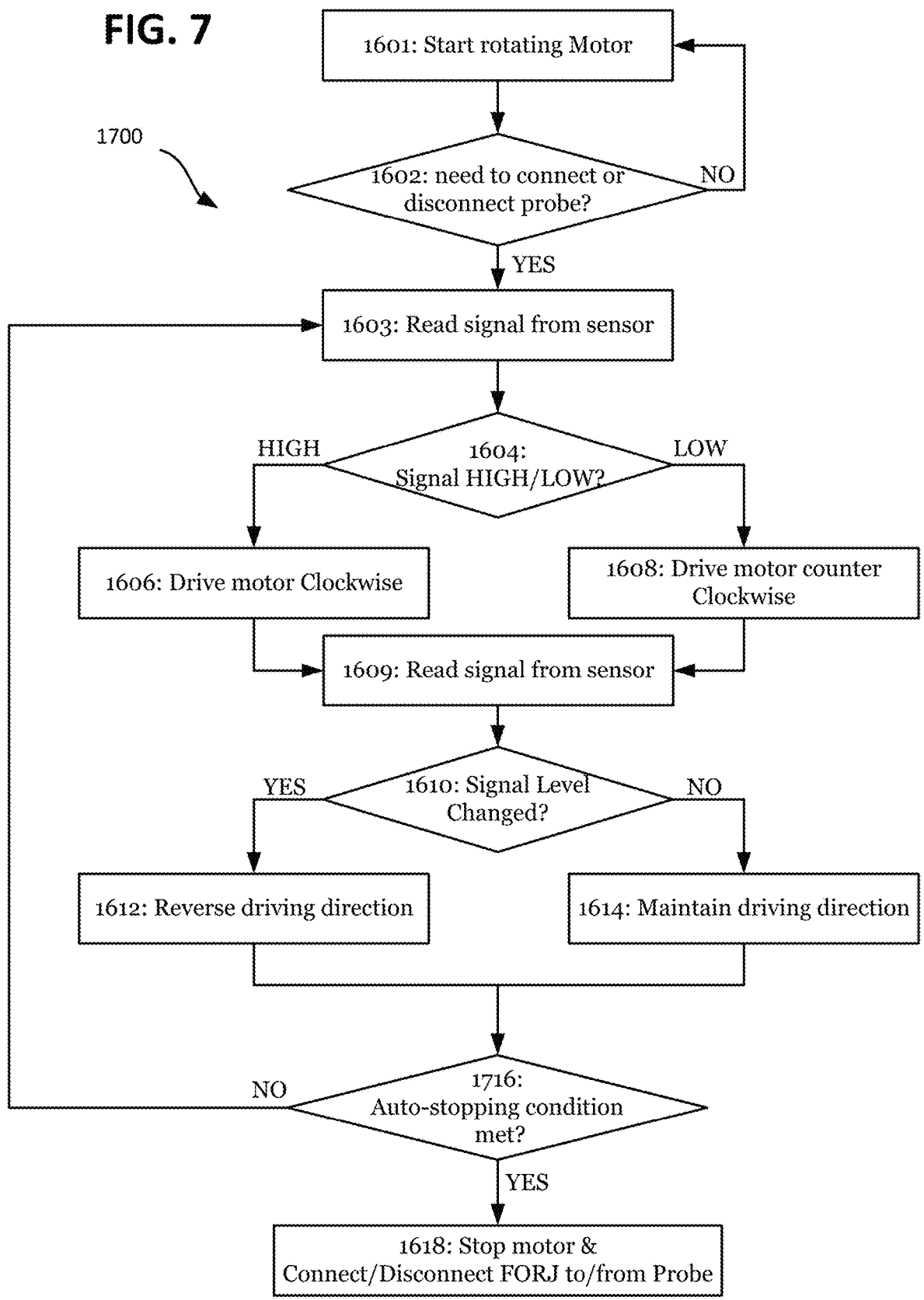
FIG. 7 shows an exemplary control process (method) of controlling a rotational position of a fiber optic rotary junction (FORJ) using servo-to-edge feedback and automatically stopping the FORJ at a desired position when a rotational condition is met.

FIG. 7 illustrates a modified control loop 1700 in which an automatic stopping condition (auto-stopping condition) can be checked at step 1716. In FIG. 7, steps 1601-1614 are the same as explained above. However, at step 1716, an auto-stopping condition can be set, so that the motor 1202 can automatically stop after the process determines that the rotational position of the motor is substantially at the desired position (or set point). For example, in one embodiment, the speed of the rotating motor can be gradually decreased while continuing to oscillate back-and-forth the motor around the desired position. Then, once the motor is within few degrees of the desired position (e.g., within +/−2 or +/−1 degrees), the controller of the PIU or the computer of the console can cause the motor to automatically stop the motor. Alternatively, the controller or computer can be programmed to stop the motor after the motor has continued to oscillate back-and-forth around the desired position for a predetermined period of time or a predetermined number of oscillations to ensure that the motor stops at the desired position. In this manner, once the auto-stopping condition has been met in step 1716 (YES), at step 1718, the motor can automatically stop and the connection and alignment of the FORJ to the probe can be safely and accurately completed without user intervention.

Here, it should be noted that stopping the motor at the desired position (or set point) is also required when the imaging probe (e.g., endoscope or catheter) has to be removed from the PIU 1130 (see step 1602). Therefore, the servo feedback control process (FIG. 4), control signals (FIG. 5), and the algorithmic flow processes (FIG. 6 and FIG. 7) not only apply to the connection and alignment of the FORJ to the probe but also apply to a process of disengaging an imaging probe from the FORJ.

Furthermore, one advantageous feature of the two-section target is that it can be used to stop the motor in at least two distinct positions. More specifically, the rotational target 116 having two separate regions (116*a* and 116*b* in FIG. 1) will necessarily have two region-to-region boundaries. That means that the described system can advantageously allow for two predetermined positions for stopping the rotor portion 112 of the motor 110. This capability can be used for loading and unloading the catheter in two distinct rotor positions.

Figure 8:
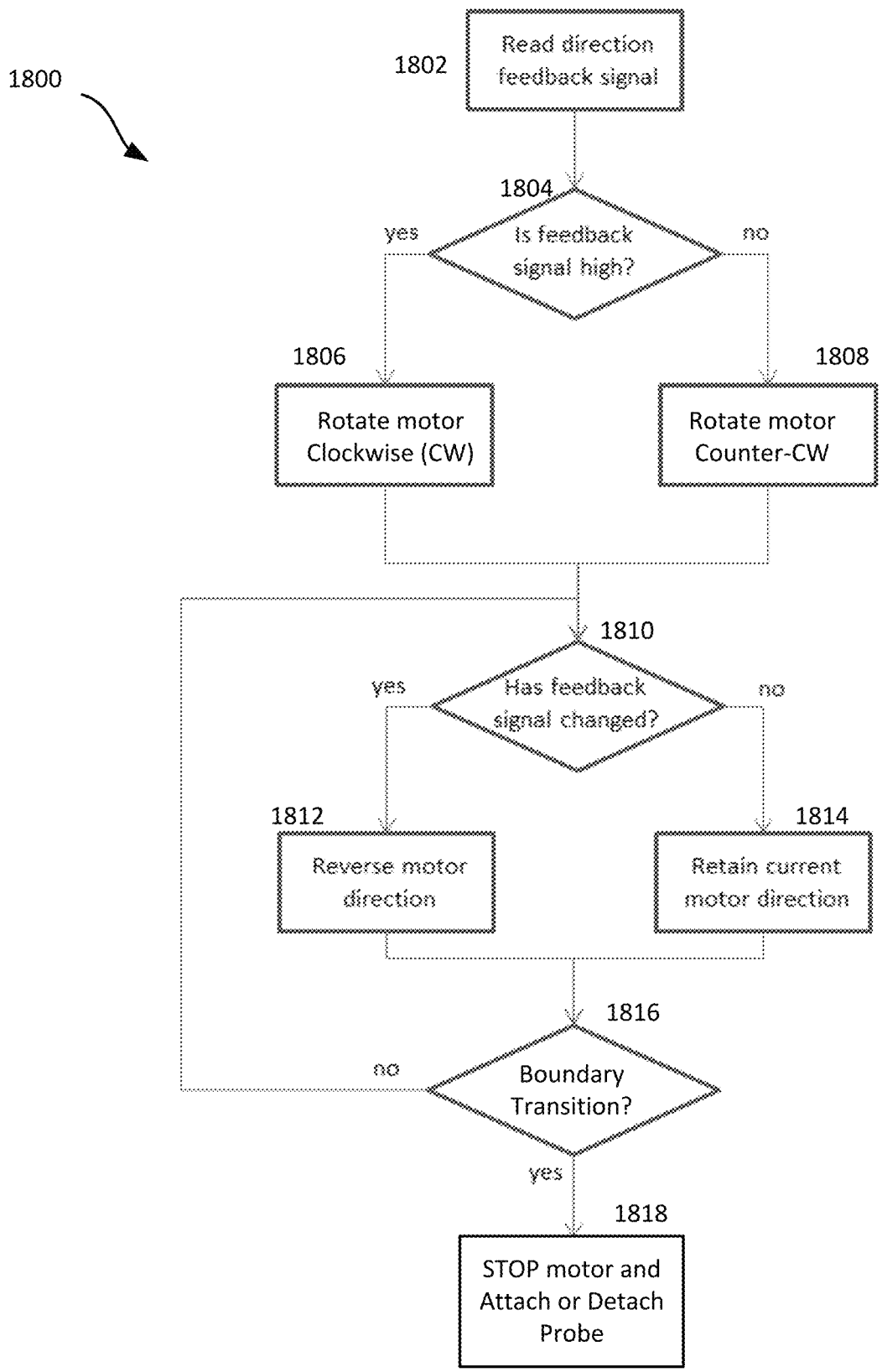
FIG. 8 and FIG. 9 show flowcharts of processes for using the boundary of the at least two distinguishable regions of the target to provide two predetermined positions for stopping the rotor.
Figure 9:
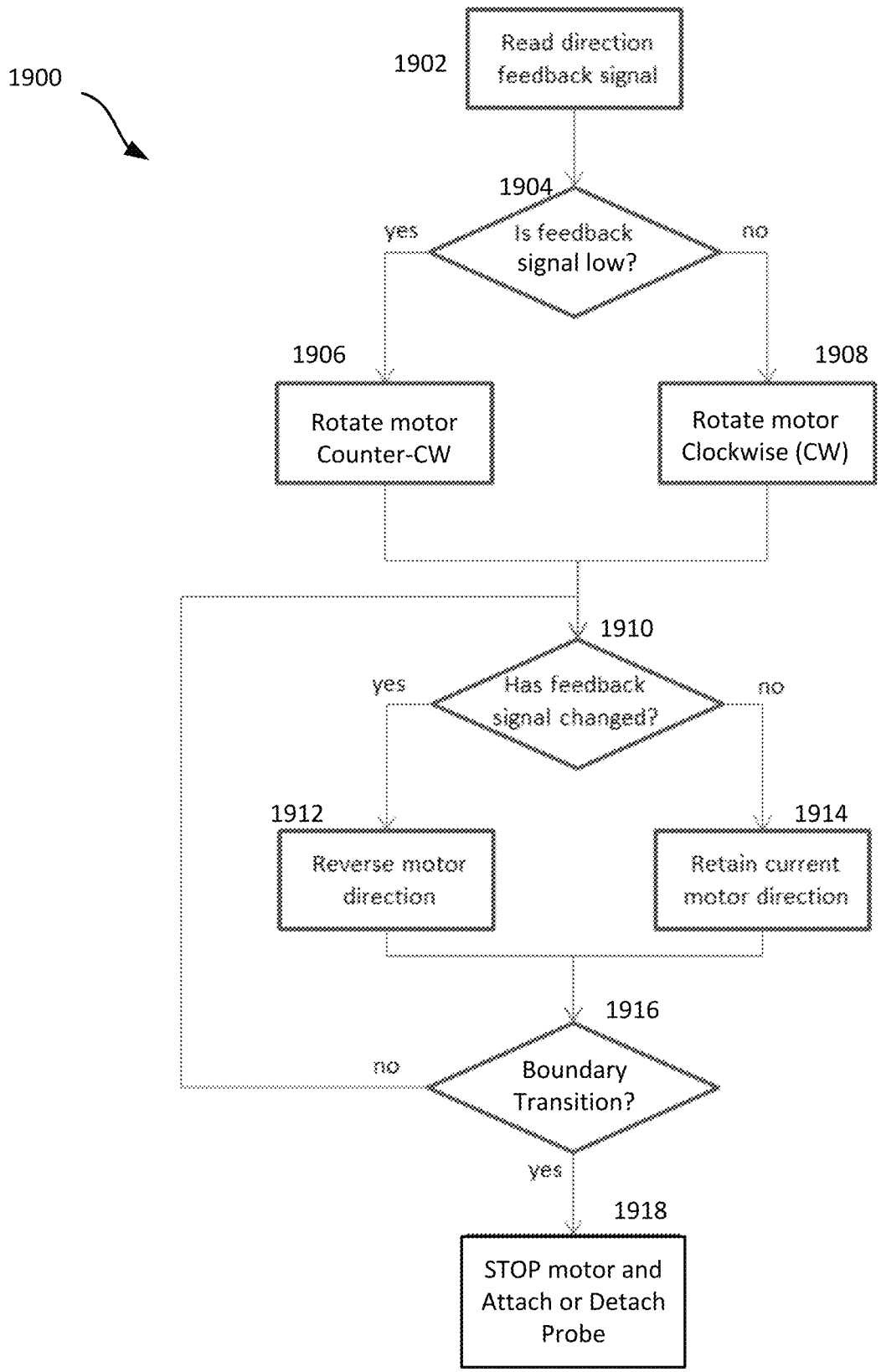

FIG. 8 and FIG. 9 show flowcharts of processes for using the boundary of the at least two distinguishable regions of the target to provide two predetermined positions for stopping the rotor. This capability can be used for loading and unloading the catheter in two distinct rotor positions. According to FIG. 8, initially, at step 1802, the motor rotates and is positioned randomly such that the motor position deviates greatly from the desired position (e.g., a position for engaging the catheter to the PIU). At step 1804, the system controller 120 reads the feedback signal 122 from the sensor (118 in FIG. 1A or 1220 in FIG. 2), and determines whether the binary signal output from the sensor is high (HIGH). As an example, the sensor feedback signal can be HIGH when the sensor 118 is proximal to the clear (transparent) region 116*b* of target 116. If the feedback signal is HIGH (yes at 1804), the controller rotates the motor in a clockwise (CW) direction at step 1806. If the signal is not HIGH (no at 1804), the system rotates the motor in a counter clockwise (CCW) direction at step 1808. At step 1810, the system controller determines whether the feedback signal level has changed. That is, at step 1810, the controller determines if the control signal is LOW. If the feedback signal has changed (yes at 1810), the controller reverses the direction of rotation of the motor, at step 1812. On the other hand, if the feedback signal has not changed (no at 1810), the system controller maintains the rotation direction of the motor. At step 1816, the controller determines whether a boundary transition has been reached. If a boundary transition has not yet been reached (not at 1816), the process returns to step 1810 and the controller continues driving the motor in the current direction (step 1814) until a boundary transition is reached.

Here, a determination as to whether a boundary transition has been reached depends exclusively of whether the level of the feedback signal has changed from HIGH to LOW. Therefore, when the feedback signal has changed at step 1810, and immediately after the motor reverses its rotation direction at step 1812, the determination at step 1816 becomes "yes", and the controller causes the motor to stop at step 1818. More specifically, as explained elsewhere in this disclosure, as the motor rotates, the sensor continuously detects its proximity to one or the other region of the rotating target and outputs one of two logical signals (HIGH or LOW). It is the controller 120 of control system that controls the motor so that it stops at TL1 or TL2, based on the sensor signal and motion control algorithm. However, before coming to a full stop, the motor will briefly oscillate back-and-forth about the position where the sensor is proximal to the boundary (TL1 or TL2) between the two regions of the target.

FIG. 9 is substantially similar to FIG. 8, except that FIG. 9 stops rotation of the motor at a different boundary than in FIG. 8. In FIG. 9, step 1902 is similar to step 1802. At step 1904, the system controller 120 reads the feedback signal 122 from the sensor (118 in FIG. 1A or 1220 in FIG. 2), and determines whether the binary signal output from the sensor is low (LOW). As an example, the sensor feedback signal can be LOW when the sensor 118 is proximal to the dark (non-transparent) region 116*a* of target 116. If the feedback signal is LOW (yes at 1904), the controller rotates the motor in a counter-clockwise (CCW) direction at step 1906. If the signal is not LOW (no at 1904), the system rotates the motor in a clockwise (CW) direction at step 1908. At step 1910, the system controller determines whether the feedback signal level has changed. That is, at step 1910, now the controller determines if the control signal is HIGH. If the feedback signal has changed (yes at 1910), the controller momentarily reverses the direction of rotation of the motor, at step 1912. On the other hand, if the feedback signal has not change (no at 1910), the system controller maintains the rotation direction of the motor, at step 1914. At step 1916, the controller determines whether a boundary transition has occurred. If a boundary transition has not yet occurred (not at 1916), the process returns to step 1910 and the controller continues driving the motor in the current direction (step 1914) until a boundary transition is reached. Similar to the flow of FIG. 8, in FIG. 9, when the feedback signal has changed at step 1910, and immediately after the motor reverses its rotation direction at step 1912, the determination at step 1916 becomes "yes", and the controller causes the motor to stop at step 1918.

However, while in FIG. 8 the motor stops at step 1818 when the sensor signal changes from HIGH to LOW and a first boundary transition occurs, in FIG. 9, the motor stops at step 1918 when the sensor signal changes from LOW to HIGH and a second boundary transition occurs. More specifically, since the sensor signal changes level based on the sensor proximity to one of the two distinguishable regions, the described system will advantageously allow for two predetermined positions for stopping the rotor, and this capability can be used for loading and unloading a catheter to/from the PIU in two distinct rotor positions.

In this manner, the capability for loading and unloading the catheter in two distinct rotor positions provides a first stop position for loading and a second distinct stop position for unloading the catheter. A process of loading and unloading (i.e., attaching and detaching) a catheter to the patient interface unit (PIU) is described, for example, in applicant's co-pending patent application publication US 2020/00085285, the disclosure of which is incorporated by reference herein in its entirety.

According to the present disclosure, a low-cost position control scheme for BLDC motors can be achieved if the signal feedback is based on rotation direction rather than actual position. This leads to significant reduction in components of the sensing circuit.

According to the present disclosure, it is a desired behavior of the system to always maintain the angular position (motor remains energized and position is maintained) while the motor oscillates back-and-forth around the desired position. This allows the controller to keep controlling the angular position of the motor throughout the catheter locking/unlocking automatic procedure.

The "servo-to-edge" rotation-based feedback system disclosed herein is different from position-based encoder controlled systems in the sense that the present disclosure presents a way to position a servo-motor at any position (shaft position at which edge transition occurs). The "servo-to-edge" concept disclosed herein applies to any servo-motor, BLDC or others (could be voice coil). Within the BLDC motor family, the disclosure applies to both Hall-sensored and sensorless motors.

As described above certain aspects or embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. An I/O interface can be used to provide communication interfaces to input and output devices, which may include a keyboard, a display, a mouse, a touch screen, touchless interface (e.g., a gesture recognition device) a printing device, a light pen, an optical storage device, a scanner, a microphone, a camera, a drive, communication cable and a network (either wired or wireless).

Definitions

In referring to the description, specific details are set forth in order to provide a thorough understanding of the examples disclosed. In other instances, well-known methods, procedures, components and circuits have not been described in detail as not to unnecessarily lengthen the present disclosure. Unless defined otherwise herein, all technical and scientific terms used herein have the same meaning as commonly understood by one of ordinary skill in the art. The breadth of the present disclosure is not to be limited by the subject specification, but rather only by the plain meaning of the claim terms employed.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", may be abbreviated as "/", and it includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about" or "approximately" as used herein means, for example, within 10%, within 5%, or less. In some embodiments, the term "about" may mean within measurement error. In this regard, where described or claimed, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range, if recited herein, is intended to include all sub-ranges subsumed therein.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. As used herein, the singular forms "a", "an", "said" and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated. It is further noted that some claims may be drafted to exclude any optional element; such claims may use exclusive terminology as "solely," "only" and the like in connection with the recitation of claim elements, or it may use of a "negative" limitation.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. An apparatus comprising:
    a motor having an axis and including a rotor portion and a stator portion, the rotor portion adapted to rotate relative to the stator portion in any of a first direction and a second direction about the axis;
    a target having at least two distinguishable regions forming at least one boundary between the at least two distinguishable regions;
    a sensor configured to be positioned in close proximity to the target and to output a signal indicative of which one of the at least two distinguishable regions of the target is proximal to the sensor;
    a controller configured to receive the signal from the sensor and to control a rotational direction of the rotor portion based on the sensor signal;
    a fiber optic rotary junction having a stationary portion and a rotatable portion, wherein the rotor portion of the motor is configured to rotate the rotatable portion of the fiber optic rotary junction; and
    a connector configured to connect the rotatable portion of the fiber optic rotary junction to a rotatable fiber of an imaging probe so as to transmit rotational torque from the motor to the rotatable fiber of the imaging probe and so as to transmit light from the fiber optic rotary junction to the rotatable fiber of the imaging probe,
    wherein the sensor detects its proximity to the target when the rotor portion rotates the rotatable portion of the fiber optic rotary junction, and
    wherein, during rotation of the rotor portion, the controller causes the motor to reverse its rotational direction when the rotatable portion of the fiber optic rotary junction crosses a predetermined rotational position such that a first signal from the sensor indicating its proximity to the first of the at least two distinguishable regions prompts the controller to cause the rotor portion to rotate in the first direction and a second signal from the sensor indicating its proximity to the second of the at least two distinguishable regions prompts the controller to cause the rotor portion to rotate in the second direction opposite to the first direction, thereby causing the rotor portion to oscillate about and/or stop at a position where the sensor is proximal to the at least one boundary.

2. The apparatus according to claim 1, wherein the sensor is affixed to the stator portion of the motor, and the target is affixed to the rotor portion of the motor.

3. The apparatus according to claim 1, wherein the target is affixed to the stator portion of the motor, and the sensor is affixed to the rotor portion of the motor.

4. The apparatus according to claim 1,
    wherein the first direction is a clockwise direction and the second direction is a counterclockwise direction, and
    wherein, in response to receiving any one of the first and second signals, the controller causes the rotor portion to change its rotational direction from the clockwise direction to the counterclockwise direction or vice versa.

5. The apparatus according to claim 1,
    wherein the sensor emits a binary signal comprising at two distinguishable levels including a high level and a low level, each of the two distinguishable levels respectively corresponding to one of the at least two distinguishable regions of the target being proximal to the sensor.

6. The apparatus according to claim 1, wherein the motor is a brushless motor having a hollow shaft.

7. The apparatus according to claim 6,
    wherein the target is a disc mounted on the hollow shaft of the motor, wherein the disc includes the at least two distinguishable regions, wherein the sensor is configured to detect its proximity to a first one of the two distinguishable regions of the disc, and output the first signal which is indicative of the rotor portion of the motor having rotated the rotatable portion of the fiber optic rotary junction in a clockwise direction, and wherein the sensor is configured to detect its proximity to a second one of the two distinguishable regions of the disc, and output the second signal which is indicative of the rotor portion of the motor having rotated the rotatable portion of the fiber optic rotary junction in a counter-clockwise direction.

8. The apparatus according to claim 1,
wherein the sensor includes a radiation emitting unit and a radiation detecting unit, and
wherein the radiation detecting unit detects an intensity of a radiation signal emitted by the radiation emitting unit in response to the at least one of the two distinguishable regions of the disc being proximal to the sensor.

9. The apparatus according to claim 8,
wherein the radiation emitting unit is a light emitting diode configured to emit light and the radiation detecting unit is a photodiode which outputs a sensor signal corresponding to the intensity of the detected light, and
wherein the controller receives the sensor signal from the photodiode as a feedback signal for controlling the rotational direction of the motor.

10. The apparatus according to claim 9, wherein the feedback signal has only two logic levels.

11. The apparatus according to claim 10, wherein the controller controls the rotational direction of the motor according to a servo-loop where the motor is servo-ed around a transition between the two logic levels of the feedback signal, such that the motor is controlled to rotate either in the first direction or in the second direction opposite to the first direction.

12. The apparatus according to claim 1, wherein, based on the one or more signals output by the sensor, the controller controls the rotational direction of the motor such that the motor reverses its rotational direction in an oscillating manner back-and-forth around the predetermined rotational position until a user stops the motor at substantially the predetermined rotational position.

13. The apparatus according to claim 1,
wherein, based on the one or more signals output by the sensor, the controller controls the rotational direction of the motor such that the motor reverses its rotational direction in an oscillating manner back-and-forth around the predetermined rotational position until an automatic stopping condition is met, and wherein, when the automatic stopping condition is met, the controller stops the motor within a range of zero to two degrees from the predetermined rotational position.

14. The apparatus according to claim 1,
wherein the target is a disc mounted on the rotor portion of the motor,
wherein the disc includes a first boundary and a second boundary between the at least two distinguishable regions,
wherein the one or more signals output by the sensor includes a binary signal comprising at two distinguishable levels including a high level and a low level, wherein, based on the low level or high level of the binary signal, the controller causes the rotor portion to stop at the first boundary or at the second boundary, respectively, and wherein the first boundary corresponds to a first predetermined position for attaching the imaging probe to the connector and the second boundary corresponds to a second predetermined positon for detaching the imaging probe from the connector.

15. A method of controlling a motor of a fiber optic rotary junction which is connectable to an imaging probe via a connector, the motor having a rotor portion adapted to rotate about an axis relative to a stator portion, the method comprising:

providing, on one of the rotor portion and the stator portion, a target having at least two distinguishable regions and at least one boundary between the at least two distinguishable regions;

providing a sensor on one of the rotor portion and the stator portion on which the target is not provided;

connecting a rotatable portion of the fiber optic rotary junction to a rotatable fiber of the imaging probe so as to transmit rotational torque from the motor to the rotatable fiber of the imaging probe and so as to transmit light from the fiber optic rotary junction to the rotatable fiber of the imaging probe, rotating the rotor portion of the motor about the axis relative to the stator portion in a first direction or a second direction opposite to the first direction;

outputting, using the sensor, one or more signals indicative of which one of the at least two distinguishable regions of the target is proximal to the sensor; and controlling, using a controller, a rotational direction of the rotor portion based on the one or more signals output from the sensor, wherein the sensor detects its proximity to the target when the rotor portion rotates the rotatable portion of the fiber optic rotary junction, and wherein, during rotation of the rotor portion, the controller causes the motor to reverse its rotational direction when the rotatable portion of the fiber optic rotary junction crosses a predetermined rotational position such that a first signal from the sensor indicating its proximity to the first of the at least two distinguishable regions prompts the controller to cause the rotor portion to rotate in the first direction and a second signal from the sensor indicating its proximity to the second of the at least two distinguishable regions prompts the controller to cause the rotor portion to rotate in the second direction opposite to the first direction, thereby causing the rotor portion to oscillate about and/or stop at a position where the sensor is proximal to the at least one boundary.

16. The method according to claim 14, wherein providing the sensor includes affixing the sensor to the stator portion of the motor, and providing the target includes affixing the target to the rotor portion of the motor.

17. The method according to claim 14, wherein providing the target includes affixing the target to the stator portion of the motor, and providing the sensor includes affixing the sensor to the rotor portion of the motor.

18. The method according to claim 14,
wherein controlling the rotational direction of the rotor portion includes alternately rotating the rotor portion in the first direction which is a clockwise direction and in the second direction which is a counterclockwise direction, and wherein, in response to receiving any one of the first and second signals from the sensor, the controlling includes causing the rotor portion to reverse its rotational direction from the clockwise direction to the counterclockwise direction or vice versa.

19. The method according to claim 17, further comprising:
controlling the rotational direction of the rotor portion such that the motor reverses its rotational direction in an oscillating manner back-and-forth around a predetermined rotational position, and
stopping rotation of the rotor portion when the target is within a range of zero to two degrees from the predetermined rotational position.

20. A non-transitory computer readable medium storing therein computer-executable code to cause a computer to perform the method according to claim 15.

21. An endoscope imaging system, comprising:
an imaging probe having proximal and distal ends, and configured to be insertable into a luminal sample;
an imaging console including a data-processing computer configured to receive data representing energy delivered to and/or collected from the luminal sample via the imaging probe;
a patient interface unit (PIU) configured to detachably connect the imaging probe to the imaging console; and
a fiber optic rotary junction (FORJ) arranged inside the PUI, the FORJ including:
a rotatable portion configured to connect to the proximal end of the imaging probe; and
a motor configured to rotate the rotatable portion of the fiber optic rotary junction;
a connector configured to connect the rotatable portion of the fiber optic rotary junction to a rotatable fiber of the imaging probe so as to transmit rotational torque from the motor to the rotatable fiber of the probe and so as to transmit the energy delivered to and/or collected from the luminal sample through the fiber optic rotary junction to/from the rotatable fiber of the probe;
a sensor positioned in close proximity to a target mounted on the rotatable portion of the motor, the target having at least two distinguishable regions forming at least one boundary between the at least two distinguishable regions, and the sensor configured to output a signal indicative of which one of at least two distinguishable regions of the target is proximal to the sensor; and
a controller connected to the sensor and configured to receive the signal from the sensor,
wherein the controller uses the signal from the sensor as feedback signal to control a rotational direction of the motor such that the rotational portion of the FORJ stops a predetermined rotational position, and
wherein, during rotation of the rotational portion of the FORJ,
a first signal from the sensor indicating its proximity to the first of the at least two distinguishable regions prompts the controller to cause the motor to rotate in a first direction and a second signal from the sensor indicating its proximity to the second of the at least two distinguishable regions prompts the controller to cause the motor to rotate in the second direction opposite to the first direction, thereby causing the rotational portion of the FORJ to oscillate about and/or stop at a position where the sensor is proximal to the at least one boundary.

\* \* \* \* \*